United States Patent [19]

Kennedy et al.

[11] Patent Number: 5,075,389

[45] Date of Patent: Dec. 24, 1991

[54] α-(P-PHENYL-GLYCIDYL ETHER)-OMEGA-CHLORO POLYOLEFIN MACROMONOMERS AND COPOLYMERS THEREOF

[75] Inventors: Joseph P. Kennedy, Akron; John D. Carter, Uniontown, both of Ohio

[73] Assignee: University of Akron, Akron, Ohio

[21] Appl. No.: 655,290

[22] Filed: Feb. 14, 1991

Related U.S. Application Data

[62] Division of Ser. No. 479,522, Feb. 13, 1990, abandoned.

[51] Int. Cl.$^5$ ................................................ C08F 8/20
[52] U.S. Cl. .................................. 525/353; 525/333.7; 525/334.1; 525/359.3; 528/87; 528/91; 528/92
[58] Field of Search ............... 525/359.3, 353; 528/87, 528/91, 92

[56] References Cited

U.S. PATENT DOCUMENTS

| | | | |
|---|---|---|---|
| 3,060,140 | 10/1962 | Greenlee | 260/23 |
| 3,154,599 | 10/1964 | Wismer et al. | 260/837 |
| 3,183,281 | 5/1965 | Clemens | 260/837 |
| 4,429,099 | 1/1984 | Kennedy et al. | 528/98 |
| 4,524,162 | 6/1985 | Domeier | 523/438 |

OTHER PUBLICATIONS

Kennedy et al., "The Synthesis, Characterization & Copolymerization of the Macromonomer . . . ", Polymer Prep., 27, (29) 1986.

*Primary Examiner*—Bernard Lipman
*Attorney, Agent, or Firm*—Oldham & Oldham Company

[57] ABSTRACT

New α-phenyl-glycidyl-ether polyolefin macromonomers and copolymer of these macromonomers and ring opening polymerizable monomers have been prepared. The new copolymers based on these macromonomers form a unique set of copolymers having graft type blocks of a hydrophobic polyolefin dangling from a back bone composed of a ring opening polymerizable monomer.

11 Claims, No Drawings

α-(P-PHENYL-GLYCIDYL ETHER)-OMEGA-CHLORO POLYOLEFIN MACROMONOMERS AND COPOLYMERS THEREOF

This is a divisional of copending application Ser. No. 07/479,522 filed on Feb. 13, 1990 abandoned.

TECHNICAL FIELD

The present invention relates to novel macromonomers based on an α-phenyl-glycidyl-ether-ω-halo polyolefins and copolymers based on these macromonomers.

More particularly, this invention related to novel α-para-phenyl-glycidyl-ether-ω-halo polyisobutylene macromonomers and copolymers based on these macromonomers in conjunction with a ring opening polymerizable monomer.

BACKGROUND OF THE INVENTION

The present invention discloses an asymmetrically end capped polyolefin which has a phenyl-glycidyl-ether end group at one end of the polyolefin and a halogen atom at the other end and its use as a macromonomer in copolymerization.

In U.S. Pat. No. 3,060,140, Greenlee discloses the use of glycidyl-ether modified polybutadiene molecules. Greenlee achieved this modification by reacting polybutadiene with phenol in the presence of a Lewis acid catalyst such as $BF_3$. These functionalized butadienes could then be polymerized by standard techniques with such monomers as halohydrins using standard polymerization techniques.

Wismer et al. in U.S. Pat. No. 3,154,599 discloses the use of epoxy or phenyl-glycidyl-ether terminated epoxy resins for use in coating compositions. The phenyl-glycidyl-ether compounds of this patent are relatively low molecular weight bis epoxides for use in epoxy resin formation.

Clemens in U.S. Pat. No. 3,183,281 described the use of bis(phenyl-glycidyl-ethers) terminated polymers to form a poly epoxide. These epoxides are used in a composition comprising other types of polymers and used as an agent to form coating materials.

Domeier in U.S. Pat. No. 4,524,162 used difunctional epoxides based on phenyl-glycidyl-ethers and various other difunctional epoxides as reagents in forming particular types of polyacrylic epoxides for the use in injection molded curable thermoset resins.

Kennedy et al. in U.S. Pat. No. 4,429,009 disclosed the manufacture of phenyl-glycidyl-ethers terminated polyisobutylene for use in epoxide cure systems. All the above uses of the phenyl-glycidyl-ether constituent groups on the end or substituted onto specific types of polymers, were used to form either epoxy networks or were used to form certain types of copolymers involving indiscriminate addition of phenyl-glycidyl-ethers onto such polymers as polybutadiene. Although the Kennedy patent does disclose the manufacture of phenyl-glycidyl-ether modified polyisobutylenes, all the end groups of the polyisobutylene polymers were functionalized with phenyl-glycidyl-ether end groups.

Thus, all of the above patents describe the use of bis or poly phenyl-glycidyl-ether functionalized polymers as polymerization agents or network forming agents. There is no mention or indication in any of these patents that a macromonomer of polyisobutylene could be prepared having an active, polymerizable end group of a phenyl-glycidyl-ether with the other end being a chlorine atom. That is, none of the above patents teaches the ability to make asymmetrically terminated polyisobutylene where one end has a chlorine atom and the other end has a phenyl-glycidyl-ether group.

It is desirable to manufacture α-phenyl-glycidyl-ether-ω-chloro polyolefin macromonomers for use in copolymerization processes utilizing ring opening polymerization in the presence of polymerizable monomers such as halohydrins and simple alkyl epoxides. These copolymers could have wide utility in a number of areas including: emulsifying agents because the resulting copolymer would have a large polyisobutyl hydrophobic segment and polyether hydrophilic segment; compatibilizing agents in rubber-polymer blends and composites where one of the composite materials is a polyester fibrous material and the other is an elastomeric material such as a standard elastomer including natural rubber, polyisobutylene, polybutadiene and polyisoprene; or molecular composite components for compositions requiring excellent environmental stability and excellent damping and air retention properties.

DISCLOSURE OF THE INVENTION

It is an object of this invention to provide a polyolefin macromonomer having a ring opening polymerizable group at a first end based on phenyl-glycidyl-ether and a halogen atom at a second end.

It is another aspect of this invention to provide a process for making a polyolefin macromonomer having a ring opening polymerizable radical at a first end based on phenyl-glycidyl-ether and a halogen atom at a second end.

It is another object of this invention to provide a process for making copolymers based on a α-phenyl-glycidyl-ether-ω-chloro polyolefin macromonomer and a ring opening polymerizable monomers such as halohydrins, organic epoxides, and the like or mixtures thereof.

It is yet another object of this invention to provide a new class of copolymers where the grafting blocks are halogen capped polyolefins, particularly preferred capping atom is a chlorine atom, and a polymer backbone based on a ring opening polymerizable monomer which forms a polyether.

It is yet another aspect of this invention to provide a process for making copolymer based on a α-phenyl-glycidyl-ether-ω-chloro polyolefin macromonomer with a ring opening polymerizable monomer such as trioxane, alkyl substituted trioxane, aryl substituted trioxane, alkyl-aryl substituted trioxane, or mixtures thereof in the presence of a strong Lewis acid catalyst such as borontrifluoride, $BF_3$, particularly a stabilized form of $BF_3$ such as boron trifluoride etherate.

It is yet another object of this invention to provide a process for making copolymer based on a α-phenyl-glycidyl-ether-ω-chloro polyolefin macromonomer with a ring opening polymerizable monomer such as halohydrins, organic epoxides or mixtures thereof in the presence of a Vandenberg catalyst which is a mixture of aluminium chloride and water.

These and other aspects of the invention will become more apparent as the detailed description proceeds.

The novel macromonomers of the present invention have the following structure as depicted in Formula (I) below:

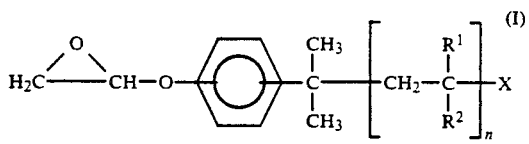

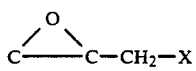

where $R^1$ is a hydrogen atom or an alkyl group preferrably having from 1 to 6 carbon atoms, $R^2$ is an alkyl group preferrably having from 1 to 6 carbon atoms, an aryl group preferrably having from 6 to 16 carbon atoms or a halogenated aryl group preferrably having from 6 to 16 carbon atoms and having from 1 to 3 halogen atoms covalently bonded to the aryl group in a position on the aryl group not adjacent to the bond linking the aryl group to the polymer backbone, X is a halogen atom and n is an integer having a numeric value from about 20 to about 2,000, preferrably from about 80 to about 1,000, or more which is roughly equivalent to a polyolefinic segment having a molecular weight from about 1,000 to about 100,000, preferably from about 4,000 to about 50,000. The glycidyl ether group and the polyolefin can be in a meta or para substitution pattern relative to each other, with the para orientation being particularly preferred.

The novel macromonomers of Formula (I) are referred to herein as α-phenyl-glycidyl-ether-ω-halo polyolefin macromonomers or sometimes herein referred to as PGEPO macromonomers where the term phenyl-glycidyl-ether, sometimes herein referred to as PGE, refers to the group as shown in Formula (II) below:

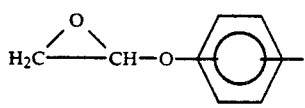

where the covalent bond on the right side of the benzene ring would represent the bond from the phenyl-glycidyl-ether radical to the polyolefin segment of the PGEPO macromonomer.

The novel macromonomers of this invention are synthesized by contacting a solution containing a polyolefin precursor having a phenol radical at a first end of the precursor and a halogen atom at a second end of the precursor as shown in formula (III) below:

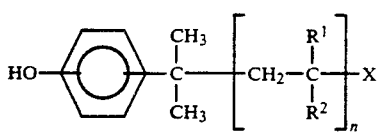

where $R^1$ is a hydrogen atom or an alkyl group preferrably having from 1 to 6 carbon atoms, $R^2$ is an alkyl group preferrably having from 1 to 6 carbon atoms, an aryl group preferrably having from 6 to 16 carbon atoms or a halogenated aryl group preferrably having from 6 to 16 carbon atoms and having from 1 to 3 halogen atoms covalently bonded to the aryl group in a position on the aryl group not adjacent to the bond linking the aryl group to the polymer backbone, X is a halogen atom and n is an integer having a numeric value from about 20 to about 2,000 or more which is roughly equivalent to a polyolefinic segment having a molecular weight from about 1,000 to about 100,000, preferably from about 4,000 to about 50,000 with a molecule of a halohydrin of formula (IV)

$$\underset{C\text{———}C-CH_2-X}{\overset{O}{\diagup\diagdown}} \quad (IV)$$

to generate a macromonomer of formula (I). Again the epoxide containing group and the polyolefin group can be oriented either in meta or para with respect of one another, with the para orientation being particularly preferred.

The synthesis of the polyolefin precursor is described in *Polymer Preprints, American Chemical Society*, (2, 29–30) (1986) by J. P. Kennedy and J. D. Carter. The preferred halohydrin is epichlorohydrin, a commercially available monomer, obtainable from numerous chemical corporations throughout the country.

A first class of novel copolymers of this invention are prepared by contacting a solution of a macromonomer of formula I with a ring opening polymerizable monomer in the presence of a Vandenberg catalyst to generate a polyetherpolyolefin graft copolymer having a halogen terminus on the polyolefin end and a hydroxy terminus on the polyether end.

A second class of novel copolymer that can be prepared from the novel macromonomers of Formula (I) are prepared by contacting a macromonomer of Formula (I) with a trioxane of Formula (V) below:

where $R^3$, $R^4$, $R^5$, $R^6$, $R^7$, and $R^8$ each are independently a hydrogen atom, an alkyl group having between 1 and 16 carbon atoms or an aryl group having between 1 and 16 carbon atoms in the presence of a strong Lewis acid catalysts such as boron trifluoride and especially a stabilized form of boron trifluoride such as boron trifluoride etherate. This second type of novel copolymer is also a polyether-polyolefin block copolymer, but the polyether segment is now a unsubstituted or substituted polymethylene block. This second type of copolymer also has a halogen terminus on the polyolefin block and a hydroxy terminus on the polyether block.

Both of the above mentioned copolymers are novel. telechelic copolymers in that they have functional groups on each end of the copolymer composition. On the polyolefin end, the terminal group is a halogen atom that can be further functionalized by known reactions that have been reported in the literature whereas the polyether terminal unit is a hydroxy group which can also be functionalized by other techniques known in the literature.

The general process for preparing the PGEPO macromonomers of the present invention is outlined below:

contacting a polyolefin precursor of formula (III) with a halohydrin in a solvent in the presence of a phase transfer catalyst and an aqueous caustic solution, to affect a reaction between the phenol radical and said halohydrin, at a temperature sufficient to promote reaction between said epichlorohydrin and said precursor from generally about 0° C. to a reflux temperature of said solvent for a time sufficient to complete the reaction between the halohydrin and said precursor usually from about one hour to about six hours, said polyolefin precursor having a molecular weight from about 1,000 to about 100,000 preferably from about 4,000 to about 50,000, said solvent being selected from the representative and illustrative group consisting of carbon tetrachloride, chloroform and other chlorinated hydrocarbon solvents usually having a boiling range from about 65° C. to about 150° C., said phase transfer catalyst being selected from the representative and illustrative group consisting of formulas (a) and (b):

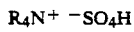  (a)

and

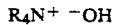  (b)

where each R is selected from the group consisting of an alkyl group having from about 1 to about 10 carbon atoms and an aryl group having from about 6 to about 14 carbon atoms and where each R may be the same or different, said caustic solution containing sufficient alkali metal hydroxide or alkaline metal hydroxide with sodium and potassium hydroxide being particularly preferred dissolved in water to yield a solution with a molarity from about 0.01 molar to about 0.09 molar, said halohydrin being a compound represented by formula (IV):

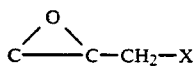  (IV)

where X is selected from the group consisting of F, Cl, Br, and I;

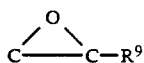  (VI)

where $R^9$ is selected form the representative and illustrative group consisting of H, hydroxy, an alkyl group preferably having from about 1 to 30 carbon atoms and being either linear or branched, and an aryl group preferrably having from about 6 to about 30 carbon atoms and being either un-substituted or substituted where the substituents are selected from the group consisting of an alkyl group having from about 1 to about 6 carbon atoms, a halogen atom such as F, Cl, or Br, a cyano group, or any alkoxy group having from about 1 to about 6 carbon atoms; and

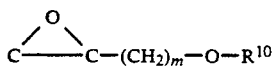  (VII)

where $R^{10}$ is selected from the representative and illustrative group consisting of H, an alkyl group preferrably from about 1 to about 30 carbon atoms, an aryl group having from about 6 to about 30 carbon atoms, a vinyl group, an a substituted vinyl group where the substituent is an alkyl group having from about 1 to about 6 carbon atoms and an aryl group having from 6 to about 11 carbon atoms and where $m$ is a whole number having a numeric value from about 1 to about 10, preferably from about 1 to about 4.

Examples of the phase transfer catalyst represented by formulas (a) and (b) are, but are not restricted to: tetra-methyl ammonium hydrogen sulfate, tetra-ethyl ammonium hydrogen sulfate, tetra-n-propyl ammonium hydrogen sulfate, tetra-n-butyl ammonium hydrogen sulfate, benzyl tri-methyl ammonium hydrogen sulfate, benzyl tri-ethyl ammonium hydrogen sulfate, benzyl tri-n-propyl ammonium hydrogen sulfate, benzyl tri-n-butyl ammonium hydrogen sulfate, tetra-methyl ammonium hydroxide, tetra-ethyl ammonium hydroxide, tetra-n-propyl ammonium hydroxide, tetra-n-butyl ammonium hydroxide, benzyl tri-methyl ammonium hydroxide, benzyl tri-ethyl ammonium hydroxide, benzyl tri-n-propyl ammonium hydroxide, benzyl tri-n-butyl ammonium hydroxide, or other similar phase transfer catalysts.

Examples of ring opening polymerizable monomers represented by formulas (IV), (VI) and (VII) are, but are not restricted to: ethylene oxide, propylene oxide, butylene oxide, pentylene oxide, styryloxide, cyclohexene oxide, hydroxy ethylene oxide, other similar epoxides, epichlorohydrin, epibromohydrin, other simple epihalohydrins, vinyl containing epoxides such as vinyl propenylepoxy ether and other similar ethylenically unsaturated epoxides, and aryl epoxy ethers.

The general process for preparing the first type of polyolefin-polyether telechelic copolymers is outlined below:

contacting a phenyl-glycidyl-ether polyolefin macromonomer of Formula (I) with a ring opening polymerizable monomer in a solvent in the presence of a Vandenberg catalyst, which is a mixture of aluminium chloride and water, solution at a temperature sufficient to promote polymerization from about 25° C. to about 100° C. and for a time sufficient to polymerize said block of said ring opening polymerizable monomer from about 1,000 to about 100,000 molecular weight preferrably from about 4,000 to about 50,000, said phenyl-glycidyl-ether polyolefin macromonomer having a molecular weight from about 1,000 to about 100,000 preferrably from about 4,000 to about 50,000, said solvent selected from the group consisting of carbon tetrachloride, chloroform and other similar chlorinated hydrocarbon solvents, said Vandenberg catalyst solution having a triethyl aluminum to water ratio from about 1.5 to 2.5 at a concentration from about 0.001 molar to about 0.009 molar, said ring opening polymerizable monomer is as previously defined.

The general process for preparing the second type of polyolefin-polyether telechelic copolymers is outlined below:

contacting a phenyl-glycidyl-ether polyolefin macromonomer of Formula (I) with a ring opening polymerizable monomer in a solvent in the presence of a boron trifluoride-etherate catalyst at a temperature sufficient to promote polymerization from about 25° C. to about 100° C. and for a time sufficient to polymerize said block of said ring opening polymerizable monomer from about 1,000 to about 100,000, preferably from about 4,000 to 50,000 molecular weight, said phenyl-glycidyl-ether macromonomer having a molecular weight from about 1,000 to about 100,000, preferably from about 4,000 to 50,000 said solvent being selected from the group consisting of carbon tetrachloride, chloroform and other chlorinated hydrocarbon solvents usually having a boiling range from about 65° C. to about 150° C., said boron trifluoride-etherate catalyst being at a concentration from about 0.001 molar to about 0.009 molar, preferably from about 0.002 to about 0.006 molar and said ring opening polymerizable monomer being given by formula (IV).

PREFERRED MODE FOR CARRYING OUT THIS REACTION

Applicants have found that the novel macromonomers of this invention and copolymers derived therefrom, have unique and interesting properties. They may have wide utility in a variety of applications. Some of these applications include compatabilizers, adhesives, emulsifiers, components for molecular composites, and fiber-rubber interface materials.

The preferred synthetic technique for the manufacture of the macromonomers of the present invention involves the reaction of a polyolefin precursor having a phenol radical at a first end and a halogen atom at a second end with a halohydrin in a caustic solution in such a manner as to yield a polyolefin macromonomer having a polymerizable radical at said first end covalently bonded to the phenoxy oxygen atom of the precursor as shown by Formula (I) above, and a halogen atom at said second end. The preferred reaction conditions for carrying out this particular synthetic reaction is to use a large excess of halohydrin and to dropwise add the caustic solution. This preferred method insures that the macromonomers will be formed preferentially over any coupling reaction that can occur between a formed PGEPO macromonomer and a polyolefin precursor.

Producution of copolymers made from the copolymerization of a macromonomer of Formula (I) and a halohydrin or an organic epoxide are best carried out using a Vandenberg catalyst. A Vandenberg catalyst is a mixture of triethyl aluminum and water, made under very precise and carefully controlled conditions to insure that an entire hydration of the triethyl aluminum does not occur. The preferred ratio of triethyl aluminum to water is 2. However, a range of ratios from about 1.5 to about 2.5 is usable. This catalyst is an extremely effective catalyst for the ring opening polymerization as defined previously by the monomers of formulas (IV), (VI) and (VII) above.

The reaction under these conditions proceeds at a satisfactory rate in the presence of a solvent such as carbon tetrachloride, chloroform, dichloromethane, or other chlorinated hydrocarbon solvents usually having a boiling range from about 65° C. to about 150° C.

The second class of copolymers described in this invention are those formed from the copolymerization of a macromonomer of Formula (I) with a trioxane of Formula (V). These copolymers render a polyolefin segment and a polymethylene oxide segment and are best accomplished in the presence of a fully halogenated Lewis acid catalyst with boron trifluoride etherate being preferred. Again, the copolymerization is performed in a carbon tetrachloride solution or other similar chlorinated hydrocarbons including but not restricted to chloroform, dichloromethane, dichloroethane, trichloroethane or tetrachloroethanes.

The above copolymers, whether they are formed from halohydrins, organic epoxides or trioxanes are separable from any homopolymers or unreacted monomers by a series of solvent extractions that will afford the copolymers of this invention to be obtained in essentially pure form. However, conditions may be optimized to such an extent that small amounts of contamination homopolymers may be tolerated. The preferred $\alpha$-olefin for the macromonomers of Formula (I) is isobutylene although other olefins are usable including, but not restricted to, $\beta$-pinene, 2-butene, 2-methyl-1-butene, 4-methyl-pentene, 3-methyl-1-butene, vinyl cyclohexane, isobutyl vinyl ether, methyl vinyl ether, ethyl vinyl ether, and other similar olefinic monomers, styrene, $\alpha$-methylstyrene, p-chlorostyrene, p-fluorostyrene, p-bromostyrene, dichlorostyrenes and difluorostyrenes. The invention can be further defined and illustrated by a series of representative examples which follow.

EXAMPLE 1

This example illustrates the preparation of $\alpha$-(p-Phenyl-Glycidyl-Ether)-$\omega$-Chloro Polyisobutylene from $\alpha$-(p-hydroxyphenyl)-$\omega$-Chloro Polyisobutylene having a $M_n$ of 16,100 and epichlorohydrin.

A CCl$_4$ solution of 0.003 molar phenol-capped polyisobutylene ($M_n$=16,100 and X in formula (I) is chlorine), 0.80 molar epichlorohydrin, and 0.03 molar tetrabutylammonium hydrogen sulfate was brought to reflux. To this was added dropwise a 0.30 molar aqueous solution of NaOH. The reaction was allowed to proceed for 15 hours. The reaction mixture was then washed with distilled water until neutral. The bulk of CCl$_4$ was removed by a rotary evaporator and the polymer was precipitated into methanol. The polymer was then redissolved in hexane to give a concentrated solution and reprecipitated into methanol. The polymer was then redissolved in hexane to give a concentrated solution and reprecipitated into methanol. This procedure was repeated to insure complete removal of the excess epichlorohydrin. Finally, the polymer was redissolved in hexane and dried over magnesium sulfate. The solution was filtered after 16 hours, the hexane removed and the polymer dried at 40° C. for 16 hours under vacuum. The resulting polymer was determined to be 97% functionalized PGE. The molecular weight changed very light in that only one molecule of epichlorohydrin was attached to the phenolic end cap. Fourier Transform Infra-red (FTIR) and NMR spectroscopy were used to confirm the presence of the glycidyl group and the extent of modification of the phenol precursor by epichlorohydrin.

EXAMPLE 2

This example illustrates the preparation of $\alpha$-(p-Phenyl-Glycidyl-Ether)-$\omega$-Chloro Polyisobutylene from $\alpha$-(p-hydroxyphenyl)-$\omega$-Chloro Polyisobutylene having a $M_n$ of 5,600 and epichlorohydrin.

The same procedure was used as in Example 1, except, in this case, a precusor having a $M_n$ of 5,600 was used. The final product was confirmed by FTIR and NMR analysis.

EXAMPLE 3

This example illustrates the preparation of $\alpha$-(p-Phenyl-Glycidyl-Ether)-$\omega$-Chloro Polyisobutylene from $\alpha$-(p-hydroxyphenyl)-$\omega$-Chloro Polyisobutylene having a $M_n$ of 4,500 and epichlorohydrin.

The same procedure was used as in Example 1, except, in this case, a precusor having a $M_n$ of 4,500 was used. The final product was confirmed by FTIR and NMR analysis.

EXAMPLE 4

This example illustrates the preparation of the Vandenberg Catalyst.

Inside a dry box previously well flushed with dry nitrogen, 25 mL of triethylaluminum was added to 75 mL of reagent grade n-heptane. To this solution was added 250 mL of reagent grade diethyl ether. Water (1.65 mL) was then very carefully added drop by drop to the triethylaluminum solution. The final mixture was held at reflux while stirring for 2 hours under nitrogen. The catalyst was finally placed in an air-tight, dark glass bottle and stored in a dry nitrogen atmosphere.

EXAMPLE 5

Copolymerization of the Macromonomer with Epichlorohydrin

Into an air evacuated 100 mL, 2-necked round bottom flask were placed 30 mL of carbon tetrachloride, 19.1 mL of distilled and dried epichlorohydrin, 3.15 g of macromonomer ($M_n = 16,100$) from example 1, and a magnetic stirring bar. The reaction vessel was kept under positive dry nitrogen pressure. The polymerization was commenced by injecting 3 mL of Vandenberg catalyst, as described in example 4, into the reaction vessel. The reaction was run for approximately 19 hours, after which time it was terminated with 5 mL of methanol.

Selective solvent extraction was used to isolate the poly-epichlorohydrin-g-polyisobutylene copolymer. The heterogeneous reaction products were washed three times with 20 mL portions of a 5% aqueous HCl solution to remove catalyst residues. The major portion of the carbon tetrachloride was then removed by rotary vaporization and the product was extracted with distilled n-hexane until the washings were free of unreacted macromonomer. The reaction product was then extracted with chloroform until the chloroform was free of extract; separation was accomplished by filtration. After drying in a vacuum oven, percent conversion was determined by weighing.

EXAMPLE 6

The same procedure was used as in Example 5, except the $M_n$ of the macromonomer was 5600 obtained from Example 2.

EXAMPLE 7

The same procedure was used as in Example 5, except the $M_n$ of the macromonomer was 4500 obtained from Example 3.

EXAMPLE 8

A series of copolymerizations was carried out according to Example 5, with varying ratios of macromonomer (MM) to epichlorohydrin (ECH). The various ratios that were used and the final compositions that were obtained are given below:

|     | [MM]              | [ECH] | Composition Mole % | | Wt % PIB |
|-----|-------------------|-------|------|--------|----------|
|     |                   |       | MM   | ECH    |          |
| (a) | $3.9 \times 10^{-3}$ | 4.9   | 0.033 | 99.967 | 5.9     |
| (b) | $6.7 \times 10^{-3}$ | 6.7   | 0.041 | 99.959 | 6.9     |
| (c) | $1.2 \times 10^{-2}$ | 2.7   | 0.183 | 99.817 | 24.3    |

| | Polymer Properties | |
|---|---|---|
| | Tg | |
| | PIB | PECH |
| (a) | −65° C. | −10 |
| (b) | −67° C. | −26 |
| (c) | −65° C. | −35 |

EXAMPLE 9

Copolymerization of the Macromonomer with Ethylene Oxide

Into an air-evacuated 100 mL, 2-necked round bottom flask was placed 34 mL of carbon tetrachloride. Then 3.2 g of macromonomer ($M_n = 16,100$) obtained from Example 1, was dissolved in the solvent and the reaction flask was cooled to 0° C. A magnetic stirring bar was added to the flask to facilitate thorough mixing. Sixteen and one-half mL of ethylene oxide was added to the reaction vessel. The polymerization was commenced by injecting 3 mL of triethylaluminum/$H_2O$ catalyst prepared as described in Example 4. After approximately 19 hours, the reaction was killed with 5 mL of methanol.

Selective solvent extractions and centrifugation were used to isolate the copolymer from any present homopolymer. The carbon tetrachloride was removed from the reaction product by rotary vaporization. The products were shaken vigorously with n-hexane which caused the formation of an emulsion. The emulsions were destabilized by centrifugation for 30 min. using a clinical type centrifuge at 4000 rpm. This process was repeated until the supernatant n-hexane was free of polymer. The same procedure was followed using warm distilled water until the supernatant water was free of extract. The polymer was then dried in a vacuum oven for 18 hours at 50° C. and carefully weighed to determine conversion.

EXAMPLE 10

The same procedure was used as in Example 9, except the $M_n$ of the macromonomer was 5600 obtained from Example 2.

EXAMPLE 11

The same procedure was used as in Example 9, except the $M_n$ of the macromonomer was 4500 obtained from Example 3.

EXAMPLE 12

A series of copolymerization was performed according to Example 9 with varying amounts of macromonomer (MM) to ethylene oxide (EO). The various ratios that were used and the final compositions that were obtained are given below:

|     | [MM]              | [ECH] | Composition Mole % | | Wt % PIB |
|-----|-------------------|-------|------|--------|----------|
|     |                   |       | MM   | ECH    |          |
| (a) | $4.0 \times 10^{-3}$ | 6.7   | 0.049 | 99.951 | 15.4 |
| (b) | $6.0 \times 10^{-3}$ | 1.5   | 0.317 | 99.683 | 53.0 |
| (c) | $8.0 \times 10^{-3}$ | 1.6   | 0.454 | 99.546 | 62.8 |

EXAMPLE 13

Copolymerization of Macromonomer With Trioxane

Trioxane monomer was freshly distilled over calcium hydride and boron trifluoride etherate was distilled under nitrogen. Into a 500 mL, 3-necked round bottom flask, fitted with a nitrogen inlet, condenser and mechanical stirrer, were placed 200 ml of dried and distilled carbon tetrachloride, 54 g of purified monomer and 9.7 g of macromonomer obtained from Example 1. The macromonomer was dissolved in carbon tetrachloride and dried over 4A molecular sieves for about one month. The flask was submerged into an oil bath and the bath was thermostatically controlled to 60° C. The polymerization was initiated by the addition of $4 \times 10^{-2}$ moles of boron trifluoride etherate. The reaction was allowed to proceed for 2 hours, after which time 5 mL of methanol was added to kill the polymerization.

The reaction mixture was poured into a Buchner funnel and vacuum filtered. The polymer was then washed with three 30 mL portions of n-hexane. The hexane washings and carbon tetrachloride from the reaction was saved. The polymer was then transferred to an extraction thimble and extracted for 24 hours with a Soxhlet extractor, using n-hexane solvent. Percent conversion of the macromonomer was determined by evaporating the washings and noting the amount of unreacted polyisobutylene recovered.

EXAMPLE 14

The same procedure was used as in Example 13, except the $M_n$ of the macromonomer was 5600 obtained from Example 2.

EXAMPLE 15

The same procedure was used as in Example 13, except the $M_n$ of the macromonomer was 4500 obtained from Example 3.

EXAMPLE 16

A series of copolymerization were performed according to Example 13 with varying amounts of macromonomer (MM) to trioxane [TO]. The various ratios that were used and the final compositions that were obtained are given below:

|     | Mole % [MM] | Mole % [EMM] | Conversion Mole % [MM] | [TO] | Wt % PIB |
| --- | --- | --- | --- | --- | --- |
| (a) | 3.0 × | 0.10 | 10.4 | 52.0 | 3.1 |
| (b) | 3.0 × | 0.20 | 8.7 | 97.0 | 3.5 |
| (c) | 4.0 × | 0.70 | 3.8 | 50.4 | 8.0 |

All polymers show a polymethylene ether melt point at 177° C.

While in accordance with the patent statutes the best mode and preferred embodiment of the invention has been described, it is to be understood that the invention is not limited thereto, but rather is to be measured by the scope and spirit of the appended claims.

What is claimed is:

1. A macromonomer synthetic process comprising the steps of:

contacting a polyolefin precursor of formula (III)

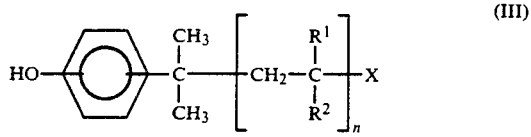

(III)

where $R^1$ is a hydrogen atom or an alkyl group having from 1 to 6 carbon atoms, $R^2$ is an alkyl group having from 1 to 6 carbon atoms, an aryl group having from 6 to 16 carbon atoms or a halogenated aryl group having from 6 to 16 carbon atoms and having from 1 to 3 halogen atoms covalently bonded to the aryl group in a position on the aryl group not adjacent to the bond linking the aryl group to the polymer backbone, X is a halogen atom and n is an integer having a numeric value from about 20 to about 2,000, with a halohydrin in a solvent in the presence of a phase transfer catalyst and an aqueous caustic solution, to affect a reaction between the phenol radical and said halohydrin, at a temperature sufficient to promote reaction between said halohydrin and said precursor from about 0° C. to a reflux temperature of said solvent for a time sufficient to complete the reaction between the halohydrin and said precursor.

2. A process according to claim 1, wherein $n$ has a value from about 80 to about 1,000.

3. A process according to claim 1, wherein said halohydrin is given by compounds of formula (IV)

(IV)

where X is selected from the group consisting of F, Cl, Br, and I.

4. A process according to claim 3, wherein said halohydrin is epichlorohydrin.

5. A process according to claim 1, wherein said solvent is selected from the group consisting of carbon tetrachloride, chloroform and other similar chlorinated hydrocarbon solvents.

6. A process according to claim 1, wherein said time is from about one hour to about six hours.

7. A process according to claim 1, wherein said phase transfer catalyst is given by formula (a)

$$R_4N^+ \ ^-SO_4H \qquad (a)$$

where each R is selected from the group consisting of an alkyl group having from about 1 to about 10 carbon atoms and an aryl group having from about 6 to about 14 carbon atoms and where each R may be the same or different.

8. A process according to claim 1, wherein said phase transfer catalyst is given by formula (b)

$$R_4N^+ \ ^-OH \qquad (b)$$

where each R is selected from the group consisting of an alkyl group having from about 1 to about 10 carbon atoms and an aryl group having from about 6 to about 14 carbon atoms and where each R may be the same or different.

9. A process according to claim 1, wherein said caustic solution contains sufficient alkali metal hydroxide or alkaline metal hydroxide dissolved in water to yield a solution with a molarity from about 0.01 molar to about 0.09 molar.

10. A process according to claim 7, wherein said phase transfer catalyst of formula (a) is tetrabutyl ammonium hydrogen sulfate.

11. A process according to claim 8, wherein said phase transfer catalyst of formula (b) is tetrabutyl ammonium hydroxide.

* * * * *